(12) United States Patent
Janssen et al.

(10) Patent No.: US 10,460,403 B2
(45) Date of Patent: Oct. 29, 2019

(54) SYSTEM AND METHOD TO REDUCE HUMAN ACTIVITY DAMAGE-INDUCED POWER OUTAGE

(71) Applicant: International Business Machines Corporation, Armonk, NY (US)

(72) Inventors: Geert Janssen, Putnam Valley, NY (US); Jayant Kalagnanam, Briarcliff Manor, NY (US); Jinjun Xiong, Goldens Bridge, NY (US); Yada Zhu, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 14/730,234

(22) Filed: Jun. 4, 2015

(65) Prior Publication Data
US 2015/0369878 A1    Dec. 24, 2015

Related U.S. Application Data

(60) Provisional application No. 62/013,613, filed on Jun. 18, 2014.

(51) Int. Cl.
*G01R 31/00* (2006.01)
*G06Q 50/06* (2012.01)
*G06Q 10/04* (2012.01)
*H02J 3/00* (2006.01)

(52) U.S. Cl.
CPC ............ *G06Q 50/06* (2013.01); *G06Q 10/04* (2013.01); *H02J 3/00* (2013.01); *H02J 2003/003* (2013.01); *H02J 2003/007* (2013.01); *Y02E 60/76* (2013.01); *Y04S 40/22* (2013.01)

(58) Field of Classification Search
CPC . G06Q 50/06; G06Q 10/04; H02J 3/00; H02J 2003/007; H02J 2003/003; Y02E 60/76; Y04S 10/54; Y04S 40/22
USPC .......................................................... 702/58
See application file for complete search history.

(56) References Cited

U.S. PATENT DOCUMENTS

| | | | | |
|---|---|---|---|---|
| 2012/0109545 | A1* | 5/2012 | Meynardi | G01R 31/085 702/58 |
| 2013/0035992 | A1* | 2/2013 | Silverman | G06Q 30/0233 705/14.1 |

* cited by examiner

*Primary Examiner* — Tha-o H Bui
(74) *Attorney, Agent, or Firm* — Daniel P. Morris, Esq.; Hoffmann & Baron, LLP

(57) ABSTRACT

A method for predicting and managing an occurrence of a power outage resulting from human activity, the method comprising the steps of: obtaining at least one short-term notification of a planned human activity event; generating a corrected human activity notification as a function of the short-term notification and data corresponding to power grid information, geographical information relating to the power grid and customers utilizing the power grid, power grid customer information, and/or historical information corresponding to prior power outages resulting from human activity events; generating an outage probability as a function of the corrected human activity notification and trained predictive modeling data; generating an optimization model as a function of the outage probability; and initiating at least one action for mitigating the occurrence of the power outage resulting from human activity as a function of the optimization model.

23 Claims, 14 Drawing Sheets

*FIG. 3E*

VISIT PLAN PER ZONE PER WEEK

| | ZONE | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| FEB. 22, 2012 | 15 | 23 | 56 | 22 | 61 | 55 | 87 | 40 | 31 | 29 | 15 | 24 | 25 |
| FEB. 15, 2012 | 1 | 1 | 9 | 6 | 12 | 9 | 12 | 7 | 8 | 4 | 3 | 2 | 9 |
| FEB. 8, 2012 | 1 | 2 | 39 | 6 | 10 | 22 | 29 | 2 | 1 | 1 | 6 | 0 | 5 |
| FEB. 1, 2012 | 2 | 2 | 0 | 0 | 3 | 3 | 1 | 0 | 5 | 2 | 0 | 1 | 2 |

*FIG. 3F*

WEEKLY VISIT PLAN

| ID | 12G032774 | 12G029539 | 12G032988 | 12G032087 | 12G032427 | 12G033714 | 12G034180 | 12G033912 | 12G034155 |
|---|---|---|---|---|---|---|---|---|---|
| RISK | 5.04 | 1.07 | 1.30 | 1.93 | 1.73 | 6.88 | 1.56 | 1.40 | 1.09 |

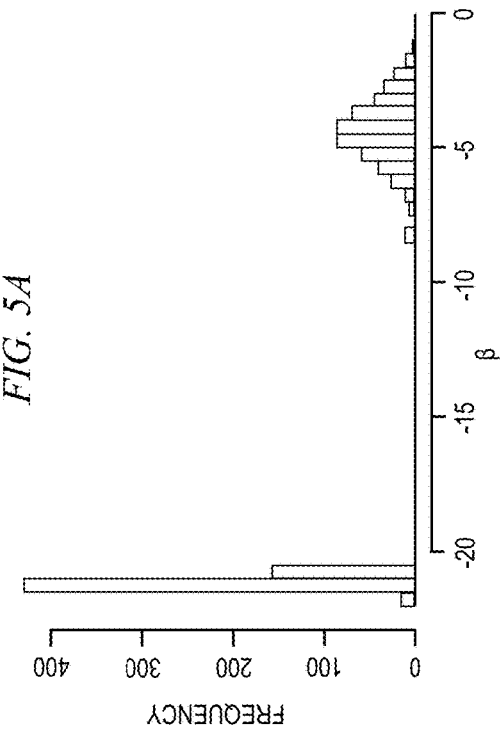
FIG. 5A
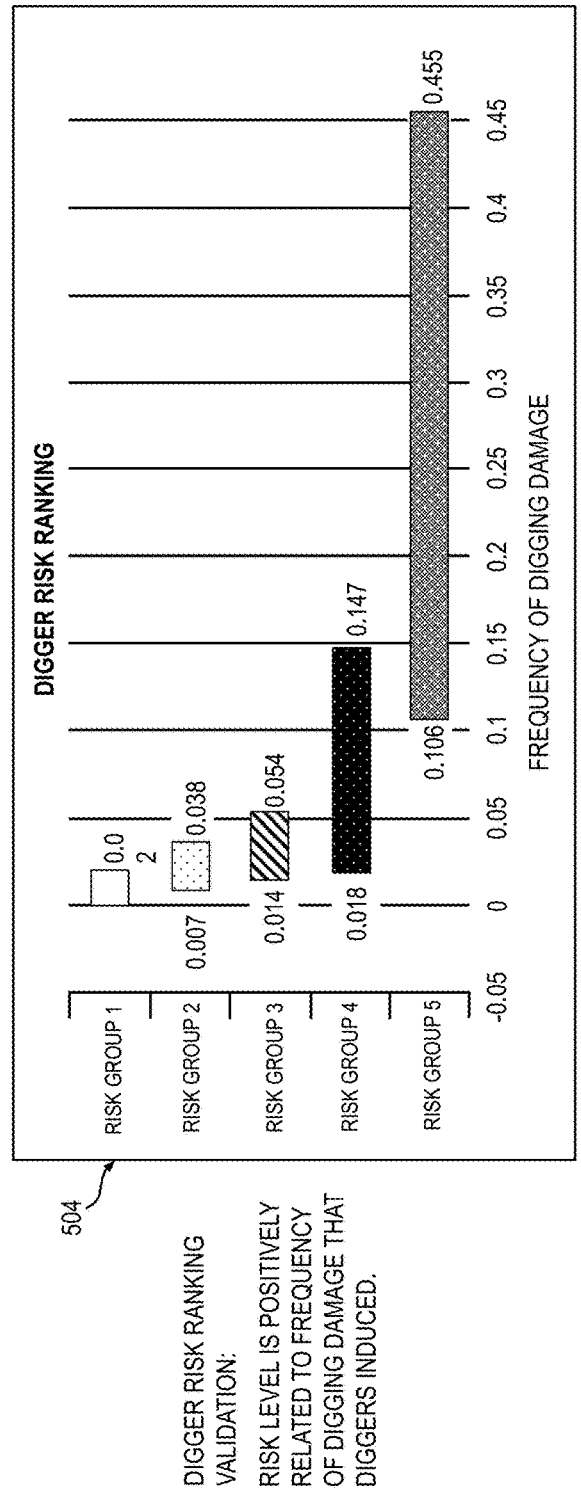
FIG. 5B
| THRESHOLD | RANK |
|---|---|
| $\beta =< -5$ | 1 |
| $-5 < \beta =< -2$ | 2 |
| $-2 < \beta =< 0$ | 3 |
| $0 < \beta =< 1$ | 4 |
| $1 < \beta$ | 5 |
WHERE RANK 5 IS MOST RISKY GROUP
FIG. 5C
DIGGER RISK RANKING VALIDATION:
RISK LEVEL IS POSITIVELY RELATED TO FREQUENCY OF DIGGING DAMAGE THAT DIGGERS INDUCED.

FIG. 6A

OUTAGE PREDICTION

| METRIC | ID | ZONE ID | DIGGER ID | NUMBER OF CUSTOMERS | ACTIVITY | OUTAGE PROBABILITY | OUTAGE RISK |
|---|---|---|---|---|---|---|---|
| VALUE | 12G033832 | 12 | 818 | 5 | SOIL-RELATED | 0.000 | 0.000 |

FIG. 6B

LIST OF PREDICTED OUTAGE EVENTS

| ID | 12G030052 | 12G028007 | 12G032774 | 12G032087 | 12G033714 | 12G025784 | 12G029564 | 12G030260 |
|---|---|---|---|---|---|---|---|---|
| PROBABILITY | 0.059 | 0.031 | 0.265 | 0.054 | 0.036 | 0.082 | 0.085 | 0.080 |

LIST OF PREDICTED OUTAGE EVENTS (CONTINUED)

| ID | 12G030535 | 12G030643 | 12G033447 | 12G033450 | 12G032445 | 12G029859 | 12G027171 |
|---|---|---|---|---|---|---|---|
| PROBABILITY | 0.062 | 0.062 | 0.053 | 0.085 | 0.036 | 0.049 | 0.163 |

LIST OF PREDICTED OUTAGE EVENTS -- THRESHOLD 0.04

| ID | 12G030082 | 12G032774 | 12G032087 | 12G025784 | 12G029564 | 12G030260 |
|---|---|---|---|---|---|---|
| PROBABILITY | 0.059 | 0.265 | 0.054 | 0.082 | 0.085 | 0.080 |

LIST OF PREDICTED OUTAGE EVENTS -- THRESHOLD 0.04 (CONTINUED)

| ID | 12G030535 | 12G030643 | 12G033447 | 12G033450 | 12G029859 | 12G027171 |
|---|---|---|---|---|---|---|
| PROBABILITY | 0.062 | 0.062 | 0.053 | 0.085 | 0.048 | 0.163 |

SYSTEM AND METHOD TO REDUCE HUMAN ACTIVITY DAMAGE-INDUCED POWER OUTAGE

CROSS-REFERENCE TO RELATED APPLICATIONS

This application claims the benefit of U.S. Provisional Patent Application No. 62/013,613 filed on Jun. 18, 2014, the complete disclosure of which is expressly incorporated herein by reference in its entirety for all purposes.

BACKGROUND OF THE INVENTION

The present invention relates generally to the electrical, electronic and computer arts, and, more particularly, to methods, apparatus and systems for event prediction and management.

Under certain conditions, such as, for example, during mild weather, human activity is often a driven factor in the cause of power outages. For example, various excavation activities associated with the construction and maintenance of underground infrastructure (e.g., water pipes, telecommunication cables, road work, etc.) can damage underground power lines, either causing an immediate outage or contributing to a subsequent outage (e.g., an outage occurring days, weeks or months after a damage incident). Each year this type of human error can create safety issues and incur significant financial loss.

Conventional approaches to mitigating power outages generally involve the manual and subjective task of ranking individuals based on a frequency of causing power outages to thereby predict the risk of an outage. This method, however, ignores the impact of other contributing factors associated with human activity, such as, but not limited to, activity type, activity location, etc. Another challenge in mitigating outages is the management of limited resources, such as, for example, crew and budget allocation, under various uncertainties to reduce the risk of outages.

BRIEF SUMMARY

Principles of the invention, according to embodiments thereof, provide techniques for predicting and managing power outages resulting from human activity. In one embodiment, an exemplary method for predicting and managing an occurrence of a power outage resulting from human activity includes the steps of: obtaining at least one notification indicative of a planned human activity event occurring within a prescribed period of time; generating, using a data correction module, a corrected human activity notification as a function of said at least one notification indicative of the planned human activity event and data corresponding to at least one of power grid information, geographical information relating to the power grid and customers utilizing the power grid, power grid customer information, and historical information corresponding to prior power outages resulting from human activity events; generating, using a first predictive modeling module, an outage probability as a function of the corrected human activity notification and trained predictive modeling data, the outage probability indicative of a likelihood of a power outage resulting from the planned human activity event; generating, using a response optimization module, an optimization model indicative of an outage probability as a function of said outage probability; and initiating at least one action for mitigating the occurrence of said power outage resulting from human activity as a function of said optimization model.

In another embodiment, an exemplary apparatus for predicting and managing an occurrence of a power outage resulting from human activity includes a data correction module configured to obtain at least one notification indicative of a planned human activity event occurring within a prescribed period of time and to generate a corrected human activity notification as a function of the notification indicative of the planned human activity event and data corresponding to power grid information, geographical information relating to the power grid and customers utilizing the power grid, power grid customer information, and/or historical information corresponding to prior power outages resulting from human activity events. The apparatus further includes a first predictive modeling module configured to generate an outage probability as a function of the corrected human activity notification and trained predictive modeling data, the outage probability indicative of a likelihood of a power outage resulting from the planned human activity event, and a response optimization module configured to generate an optimization model as a function of the outage probability and to initiate at least one action for mitigating the occurrence of the power outage resulting from human activity as a function of the optimization model.

As may be used herein, "facilitating" an action includes performing the action, making the action easier, helping to carry the action out, or causing the action to be performed. Thus, by way of example only and without limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a non-transitory machine-readable storage medium with machine-usable program code for performing the indicated method steps. Furthermore, one or more embodiments of the invention or elements thereof can be implemented in the form of a system (or apparatus) including a memory, and at least one processor that is coupled to the memory and operative to perform exemplary method steps described herein. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques according to embodiments of the present invention can provide substantial beneficial technical effects. By way of example only, one or more embodiments may provide advantages including, but not limited to, using digging notifications and/or various data sources to predict human activity damage-induced power outage, and managing/optimizing responses to potential power outages based, at least in part, on predicted outage probability/risk.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

The following drawings are presented by way of example only and without limitation, wherein like reference numerals (when used) indicate corresponding elements throughout the several views, and wherein:

FIGS. 3C-3F conceptually depict illustrative results generated by the exemplary response optimization module shown in FIG. 3A, according to an embodiment of the invention;

FIG. 5A-5C conceptually depict an illustrative digger risk ranking scenario, according to an embodiment of the invention;

FIGS. 6A-6C conceptually depict an exemplary outage prediction output result which may be generated by the illustrative system shown in FIG. 1, including a listing of predicted outage events corresponding to two exemplary threshold levels, according to an embodiment of the invention;

FIG. 7 conceptually depicts exemplary digging plans over planning periods in a given zone i, according to an embodiment of the invention;

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of the present invention will be described herein in the context of illustrative embodiments of an apparatus and method based on novel analytics that utilize digging notifications and/or other data sources to predict digging damage-induced power outages and to optimize responses to potential power outages. It is to be appreciated, however, that the invention is not limited to the specific apparatus and/or methods illustratively shown and described herein. Moreover, it will become apparent to those skilled in the art given the teachings herein that numerous modifications can be made to the embodiments shown that are within the scope of the claimed invention. Thus, no limitations with respect to the embodiments shown and described herein are intended or should be inferred.

It can be shown that power outage due to digging (i.e., excavation) damage (PODD) is generally not random. Rather, digging damage is correlated to various factors, among which include, but are not limited to, digging depth, distance between a digging site and power systems, who or which company is performing the digging, the type of digging activity (e.g., construction, vegetation, placing objectives, etc.), soil type and moisture level, cable and cable joint type, previous damage, etc. Challenges to develop analytics for providing accurate prediction of power outages resulting from human activity include, for example, incomplete and inaccurate information in digging notification (e.g., digging depth is missing, distance cannot be estimated, etc.), many diggers with or without rare digging history, and unknown power system location and information, among other factors. Similarly, challenges to optimizing responses to potential power outages resulting from human activity include, for example, short-term notice (e.g., digging notifications can be available one day or one month in advance of digging), power companies generally cannot modify or otherwise suggest changes to digging plans, estimating the impact of assigning digging supervisors, among other factors.

Figure 1:
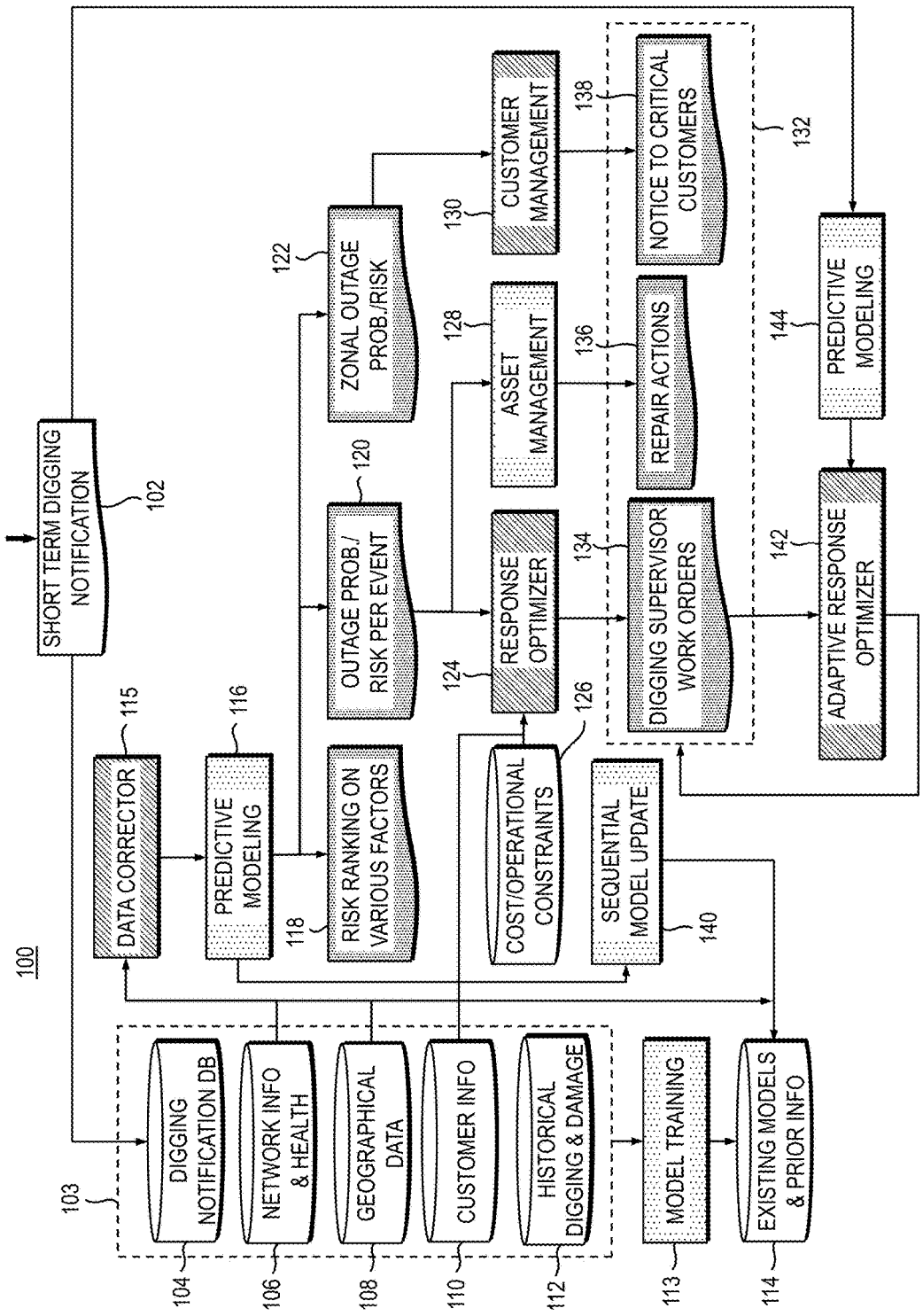
FIG. 1 is a block diagram depicting at least a portion of an exemplary system for predicting and managing power outages resulting from human activity, according to an embodiment of the invention.

FIG. 1 is a block diagram depicting at least a portion of an exemplary system 100 for predicting and managing power outages resulting from human activity, according to an embodiment of the invention. As apparent from FIG. 1, the system 100 includes an input module 102 configured to receive one or more notifications indicative of a planned human activity event occurring within a prescribed period of time; i.e., short-term digging notifications. Relative to a horizon of work scheduling (e.g., a given work order may be scheduled every week), a short-term digging notification can be defined as a notification that is received within a prescribed time period (e.g., one day) of a digging event. It is to be understood, however, that the invention is not limited to any specific time period associated with a notification of a planned human activity event.

The short-term digging notification received by input module 102 is stored in memory 103. In particular, the memory 103 is organized, according to one or more embodiments, into one or more databases. In the illustrative embodiment shown in FIG. 1, for example, the memory 103 comprises a digging notification database (DB) 104, in which the short-term digging notification is stored, and further includes a network information and health database 106, a geographical data database 108, a customer information database 110, and an historical digging and damage database 112. The digging notification database 104 stores information relating to planned digging activities by diggers (i.e., excavators), such as, for example, telecommunication companies, water companies, construction companies, etc. The planned digging activities can be reported as short as one day or as long as a couple of months in advance, although embodiments of the invention are not limited to any specific time period of advance notification. The network information and health database 106 stores, in one or more embodiments, comprehensive power grid information, such as, for example, system topology, failure and repair history, component information (e.g., cable type and cable joint types), installation year, voltage level, manufacturer, etc. The geographical data database 108 stores comprehensive geographical information related to a power grid, customers, town and zip code data, such as longitude and latitude, of each customer, grid components and their connections, and the like. The customer information database 110 stores, for example, customer geographical data, customer type (e.g., hospital, school or residential), usage patterns, meter identification, power outage history, theft history, etc. The historical digging and damage database 112 stores detailed information regarding historical power outages due to digging damage, such as, for example, who is the digger, what is the digging activity that caused the power outage, the time of the damage, the location of the damage, which digging notification resulted in the outage, outage duration, repair actions, who performed the repair, etc. Additional and/or different information may also be stored for further processing, in accordance with one or more embodiments.

At least a subset of the information stored in the various databases 104 through 112 of the memory 103 is preferably utilized for model training 113 (e.g., predictive modeling). Trained predictive modeling results, such as, for example, for digger risk ranking, trained models for prediction of outage probability/risk for each event, trained models for zonal outage probability/risk prediction, parameter values and their prior distributions, are preferably stored in an existing models and prior information database 114. One or more functional modules in the system 100 may use data stored in the existing models and prior information database 114 for subsequent processing and/or power outage prediction and management, according to one or more embodiments of the invention.

The system 100 further includes a data correction module 115. At least a subset of the information stored in the memory 103 is supplied to the data correction module 115 as inputs thereto. In the exemplary system 100, the data correction module 115 is configured to receive information from the digging notification database 104, the network information and health database 106 and the geographical data database 108, although various other combinations of information received by the data correction module 115 are similarly contemplated, including information not necessarily stored in the memory 103, but rather received from an external data resource (not explicitly shown, but implied). The received digging notifications, network information and other data sources usually contain incomplete and inaccurate information. For example, digging depth may be a missing parameter from the digging notification information, and thus the distance to an underground power cable cannot be accurately estimated based on the location of digging activities alone. The data correction module 115, according to one or more embodiments, is configured to correct a quality of the input data using a combined clustering, association and statistical modeling method. An illustrative operation of an exemplary data correction module 115 in accordance with one or more embodiments will be described in further detail below in conjunction with FIG. 2.

An output of the data correction module 115, which may be referred to herein as a corrected digging notification, is supplied to a first predictive modeling module 116. The predictive modeling module 116, in one or more embodiments, is operative to generate one or more outputs relating to an outage probability or risk. More particularly, the predictive modeling module 116 is configured to use a set of trained models and parameter priors, to receive, as an input thereof, outputs of the data correction module 115, and to predict risk ranking based on prescribed factors (e.g. digger, activity types, etc.), outage probability/risk of individual events, and zonal outage probability/risk. For example, in the embodiment shown in FIG. 1, the predictive modeling module 116 is configured to generate a first output 118 corresponding to a risk ranking based on a plurality of factors, a second output 120 corresponding to an outage probability/risk per event, and a third output 122 corresponding to a zonal outage probability/risk. The set of trained models utilized by the predictive modeling module 116 can be, for example, a logistic regression model, Bayesian logistic regression model, linear discriminant analysis (LDA), or the like, as will be known by those skilled in the art.

The system 100 further includes a response optimization module 124. The response optimization module 124 is adapted to receive the outage probability/risk for each event 120 generated by the predictive modeling module 116, and may receive at least a subset of other information stored in the memory 103, such as, for example, network information and health data stored in the network information and health database 106, geographical information stored in the geographical data database 108, and customer information stored in the customer information database 110, as well as cost and operational constraint information, which may be stored in a cost and operational constraint information database 126. The cost and operational constraint information database 126 preferably stores, such as information as, but not limited to, labor cost per hour, cost per damage, an upper limit of risk cost of power outage, constraint of type of digging supervisor, available labor hours, etc.

Using the information supplied thereto (e.g., predicted outage probability/risk of each event 120), the response optimization module 124 is preferably operative to generate an optimization model indicative of an outage probability and to initiate one or more appropriate responses 132 as a function of the outage probability/risk. For example, in this exemplary embodiment, the response optimization module 124 is operative to initiate one or more digging supervisor work orders 134 as a function of the outage probability/risk for each event 120 and to generate an optimal work schedule of digging supervisors. In other words, the response optimization module 124 is configured to optimally select a subset of digging events for digging supervisors to monitor. An illustrative operation of the response optimization module 124, according to one or more embodiments, will be described in further detail below in conjunction with FIGS. 3A and 3B.

The outage probability/risk per event output 120 generated by the predictive modeling module 116 is also supplied to an asset management module 128. The asset management module 128, according to one or more embodiments, optimally determines prescribed actions 132 to take as a function of the predicted outage probability/risk per event data 120. For example, in this exemplary embodiment, the asset management module 128 is operative to initiate one or more repair actions 136 as a function of the outage probability/risk per event output 120. The asset management module 128 may also be configured to determine preventative maintenance actions given the predicted outage probability of digging events and the health of other grid components. For example, the asset management module 128, according to one or more embodiments, is configured to select a set of cables with repeated damage history for performing preventive replacement.

In some zones, there are critical commercial customers, such as, for example, hospitals, which need time to prepare for a power outage. In order to better service such critical customers, the system 100 further includes a customer management module 130. The customer management module 130 is preferably adapted to receive the zonal outage probability/risk output 122 generated by the predictive modeling module 116 and is operative to initiate one or more appropriate actions 132 as a function of the received zonal outage probability/risk data. For example, in this exemplary embodiment, the customer management module 130 is operative to transmit a notice to critical customers 138 as a function of the zonal outage probability/risk data output 122. In one or more embodiments, the customer management module 130 is adapted to suggest a list of customers to communicate with based on the zonal outage probability/risk 122. This beneficial feature can improve a power company's customer satisfaction and image.

As previously stated, historical digging and damage information is preferably stored in an historical digging and damage database 112. As historical digging notifications and damage history information 112 accumulate, it is generally not efficient or even practical to use all of the historical data for updating the prediction model. For instance, a given pattern of digging damage will likely change over time, and thus certain historical data will essentially become outdated and irrelevant in generating future outage predictions. Consequently, the existing (i.e., trained) models and prior information database 114 is updated, in one or more embodiments, when a change in the data stream is detected. A sequential model update module 140 included in the system 100 takes an existing model as a prior parameter and, using Bayesian sequential modeling or an alternative modeling method, obtains a posterior distribution of the model parameters given a new data stream. The posterior distribution then becomes the updated prior information for the model parameters, which is stored in the existing models and prior information database 114.

The system 100 further includes an adaptive response optimization module 142. The adaptive response optimization module 142 is configured to receive one or more actions 132 (e.g., digging supervisor work orders 134). When short-term digging notifications are received via a second predictive modeling module 144, the adaptive response optimization module 142, in one or more embodiments, tries to preserve the existing optimal work schedule of digging supervisors and to optimally determine a response to the newly received digging notifications in terms of whether or not to monitor. An illustrative operation of an exemplary adaptive response optimization module 142 in accordance with one or more embodiments will be described in further detail below in conjunction with FIG. 4.

Figure 2:
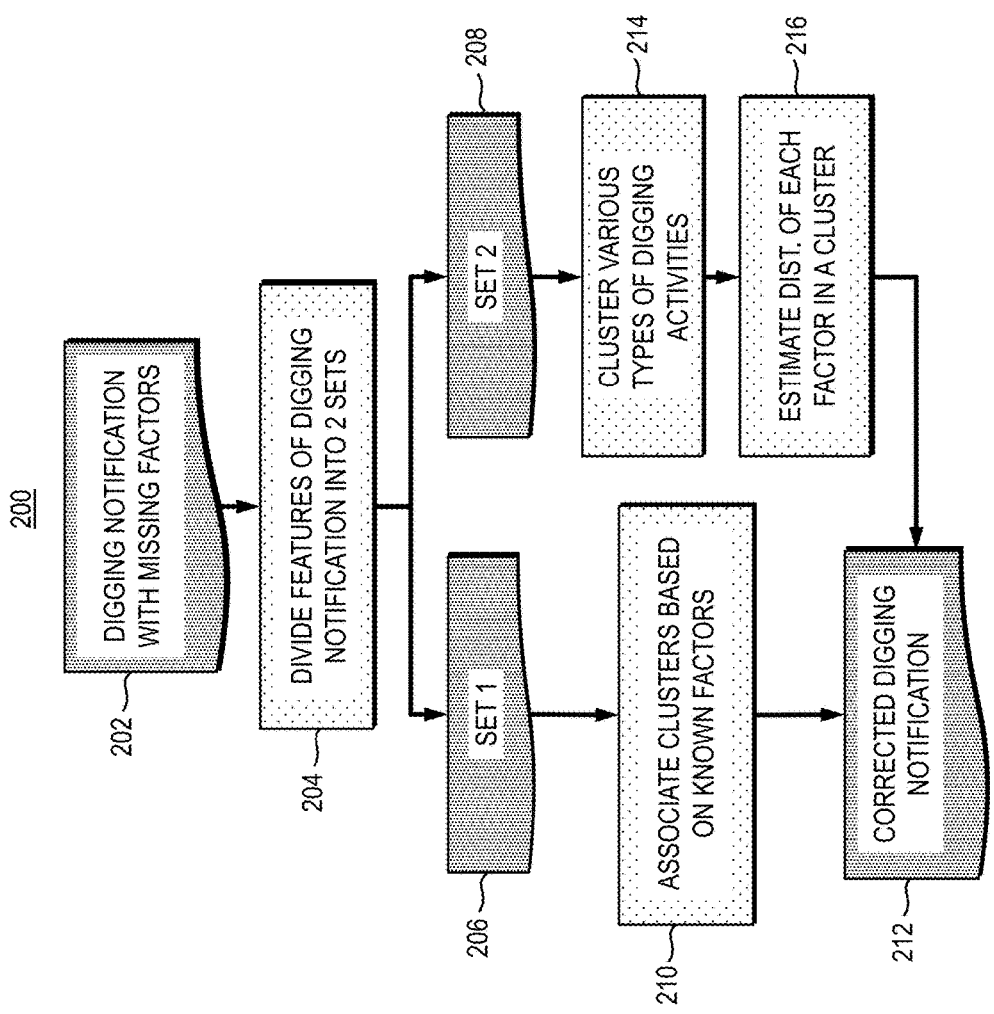
FIG. 2 is a block diagram depicting at least a portion of an exemplary data correction module suitable for use in the illustrative system for predicting and managing power outages resulting from human activity shown in FIG. 1, according to an embodiment of the invention.

FIG. 2 is a block diagram depicting at least a portion of an exemplary data correction module 200 suitable for use in the illustrative system 100 for predicting and managing power outages resulting from human activity shown in FIG. 1, according to an embodiment of the invention. The data correction module 200, which may be used to implement the data correction module 115 in FIG. 1, comprises a first processing module 204 which is adapted to receive digging notifications having missing factors 202 (e.g., from the digging notification database 104 in FIG. 1). The first processing module 204, which may be implemented as a processor, controller or the like, is configured to divide the features of the received digging notifications into two sets; namely a first set (Set 1) 206 and a second set (Set 2) 208. A non-limiting illustration of missing factors may include, for example, above/below ground, induce soil movement or not, depth, digger types (e.g., water, gas or telecommunication company), etc.

The first set of digging notification features 206 is supplied to a second processing module 210 which is configured to associate clusters based on known factors, as a function of the first set of digging notification features, and to generate, as an output thereof, a corresponding corrected digging notification 212 which includes the missing factors. The second set of digging notification features 208 is supplied to a third processing module 214 which is configured to cluster various types of digging activities. The clustered types of digging activities generated by the third processing module 214 are supplied to a fourth processing module 216 which is configured to estimate a distribution of each factor in a given cluster. The estimated distribution of each factor in the given cluster is used to generate the corrected digging notification 212. By way of example only and without limitation, the fourth processing module 216, in one or more embodiments, is operative to estimate a distribution (e.g., normal distribution N $(\hat{\mu}, \hat{\sigma})$) of depth in a cluster of activities, e.g., civil infrastructure. A model for generating a corrected digging notification, which can be employed to generate clustering, including the missing factors may be expressed as follows:

$$\min_{x,w} g(x, w) = \sum_{i \in N, j \in K} w_{ij} \|x_j - p_i\|_2^2 \quad (1)$$

such that $$\Sigma_{j \in K} w_{ij} = 1, i \in N,$$

$$w_{ij} \in \{0,1\}, i \in N, j \in K$$

$$l_j \leq \Sigma_{i \in N} w_{ij} \leq u_j, j \in K$$

where $x_j$ is the centroid of the j-th cluster and $w_{ij}=1$ if the point $p_i$ is assigned to the j-th cluster, and $l_j$ and $u_j$ represent a lower and an upper bound, respectively, of $w_{ij}$ to prevent empty clusters and keep the size of each cluster as uniform as possible.

Although the exemplary data correction module 200 shown in FIG. 2 is described in terms of multiple processing modules (e.g., processing modules 204, 210, 214 and 216) configured to perform the stated functions, it is to be appreciated that, in accordance with one or more embodiments, the functions of more than one processing module may be incorporated into the same module, which may be implemented, for example, using a single processor, controller, or other module, as will become apparent to those skilled in the art given the teachings herein.

Figure 3A:
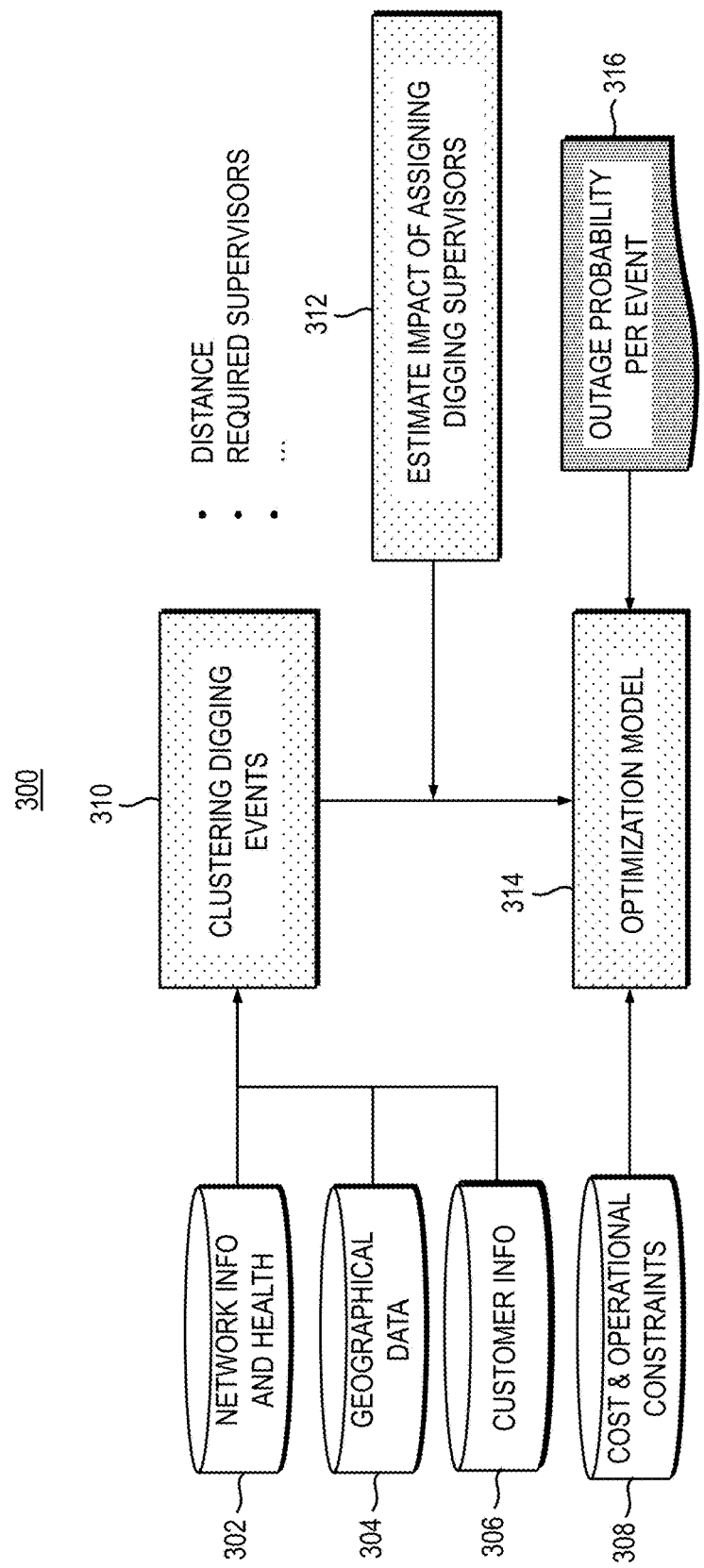
FIG. 3A is a block diagram depicting at least a portion of an exemplary response optimization module suitable for use in the illustrative system for predicting and managing power outages resulting from human activity shown in FIG. 1, according to an embodiment of the invention.

FIG. 3A is a block diagram depicting at least a portion of an exemplary response optimization module 300 suitable for use in the illustrative system 100 for predicting and managing power outages resulting from human activity shown in FIG. 1, according to an embodiment of the invention. The response optimization module 300, which may be used to implement the response optimization module 124 in FIG. 1, comprises a first processing module 310 adapted to receive prescribed information, such as, but not limited to, information from a network information and health database 302, a geographical information database 304, and a customer information database 306, each of which may represent a corresponding database in the memory 103 shown in FIG. 1. The first processing module 310 is configured to cluster digging events as a function of the information received from one or more of the respective information databases 302, 304 and 306.

The response optimization module 300 further includes a second processing module 312 configured to estimate the impact of assigning digging supervisors using simulation, or an alternative estimation methodology. A third processing module 314 is adapted to receive the clustered digging events from the first processing module 310 and the estimated results generated by the second processing module 312, and to generate an output optimization model as a function of prescribed cost and operational constraints 308 and an outage probability for each event 316. The optimization model, according to one or more embodiments, is expressed as follows:

$$\text{Min} \sum_{n=1}^{N} \sum_{m=1}^{M} x_n h_{n,m} C_{h,m} + \sum_{n=1}^{N} x_n q_n C_n + \sum_{n=1}^{N} (1 - x_n) p_n C_n \quad (2)$$

such that $$\sum_{n=1}^{N} x_n q_n C_n + \sum_{n=1}^{N} (1 - x_n) p_n C_n \leq C$$

$$\sum_{n=1}^{N} \sum_{m=1}^{M} x_n h_{n,m} \leq \sum_{m=1}^{M} \sum_{k=1}^{K_m} H_k$$

$$q_n = r_n p_n$$

$$0 \leq r_n \leq 1,$$

where N represents the total number of digging events, $p_n$ represents outage probability of the $n^{th}$ digging event, $n=1, \ldots, N$, $q_n$ represents outage probability of the $n^{th}$ event if a digging supervisor is assigned to monitor, $n=1, \ldots, N$, $C_n$ represents outage cost of the $n^{th}$ digging event, C represents an upper limit of total cost induced by a power outage, $x_n$: $\{0,1\}$, $x_n=1$ (visit),}, $x_n=0$ (no visit), $H_k$ represents available labor hours of the $k^{th}$ digging supervisor, M represents the total number of the $m^{th}$ type of digging supervisors, $h_{n,m}$ represents the required number of labor hour of the $m^{th}$ type of digging supervisors to visit the $n^{th}$ event, $C_{h,m}$ represents unit cost per labor hour of the $m^{th}$ type of digging supervisors, and $K_m$ represents the total number of available digging supervisors of the $m^{th}$ type of digging supervisors.

When M=1, that is, only one digging supervisor is needed per digging event, the above expression reduces to:

$$\text{Min} \sum_{n=1}^{N} x_n h_n C_h + \sum_{n=1}^{N} x_n q_n C_n + \sum_{n=1}^{N} (1 - x_n) p_n C_n \quad (3)$$

such that $$\sum_{n=1}^{N} x_n q_n C_n + \sum_{n=1}^{N} (1 - x_n) p_n C_n \leq C$$

-continued $$\sum_{n=1}^{N} x_n h_n \leq \sum_{k=1}^{K} H_k$$

$$q_n = r_n p_n$$

$$0 \leq r_n \leq 1,$$

where $h_n$ represents the required number of labor hours for visiting the $n^{th}$ event, $C_h$ represents the unit cost per labor hour, K represents the total number of available digging supervisors, and $H_k$ represents the available number of labor hours of the $k^{th}$ digging supervisor.

Although the exemplary response optimization module 300 shown in FIG. 3A is described in terms of multiple processing modules (e.g., processing modules 310, 312 and 314) configured to perform the stated functions, it is to be appreciated that, in accordance with one or more embodiments, the functions of more than one processing module may be incorporated into the same module, which may be implemented, for example, using a single processor or controller, as will become apparent to those skilled in the art given the teachings herein.

Figure 3B:
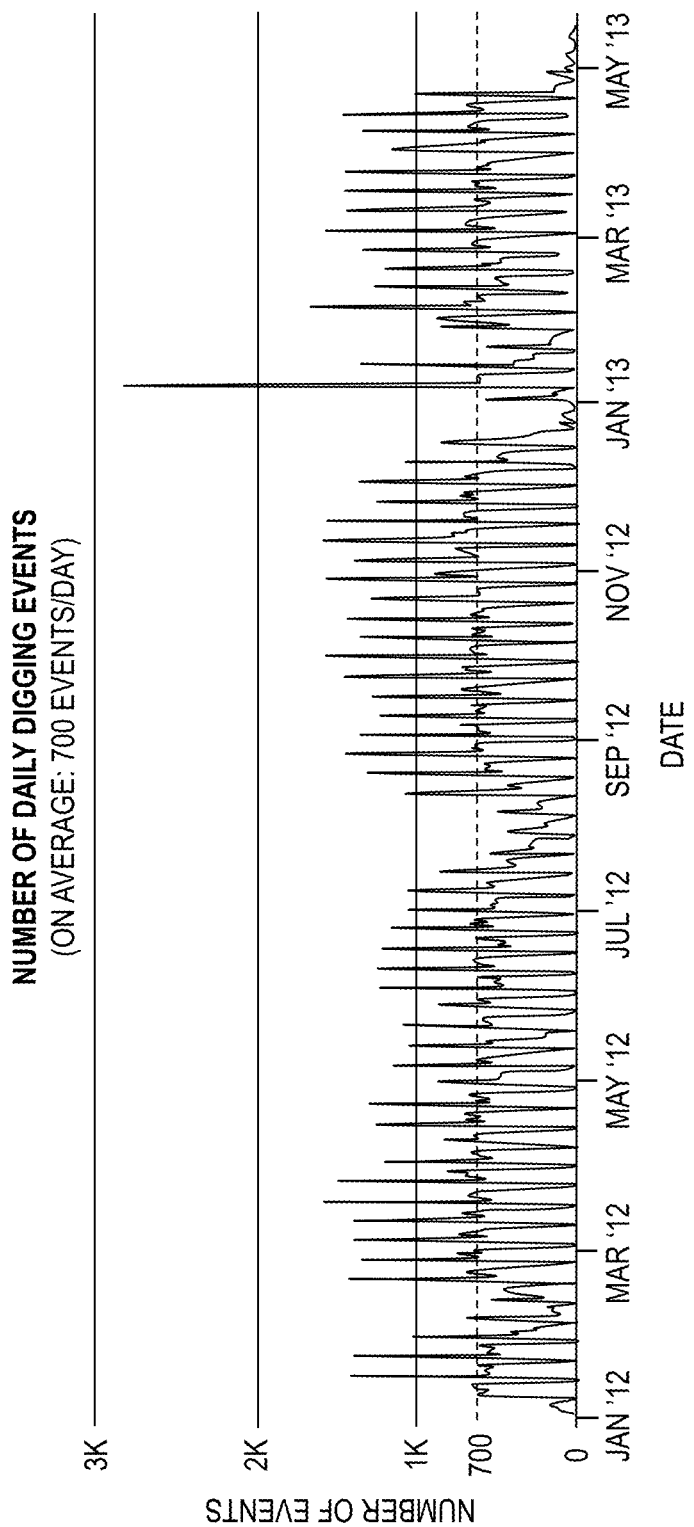
FIG. 3B is a graph conceptually depicting a number of digging events as a function of date for an illustrative scenario in which aspects of the invention may be employed.
Figure 3C:
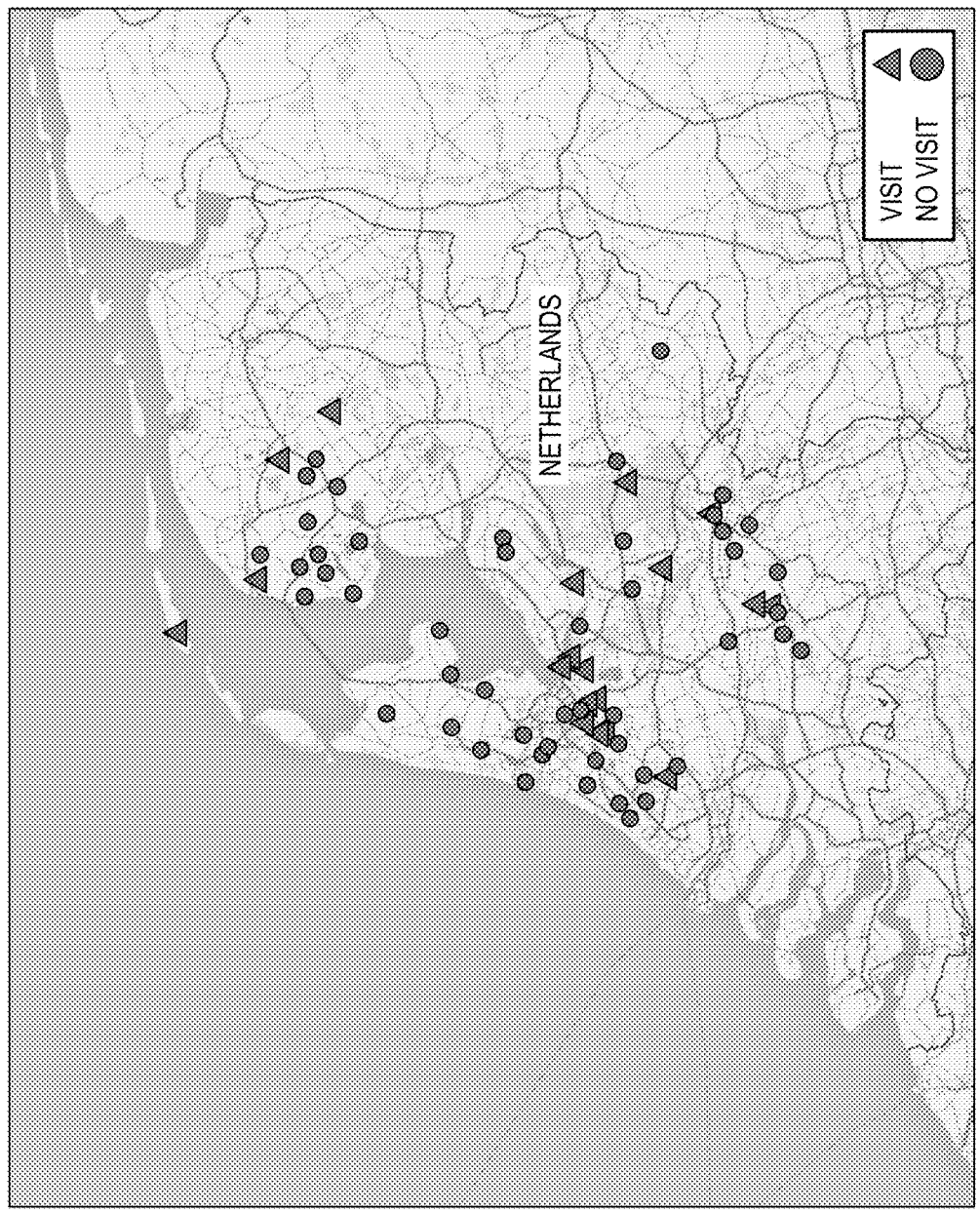
Figure 3D:
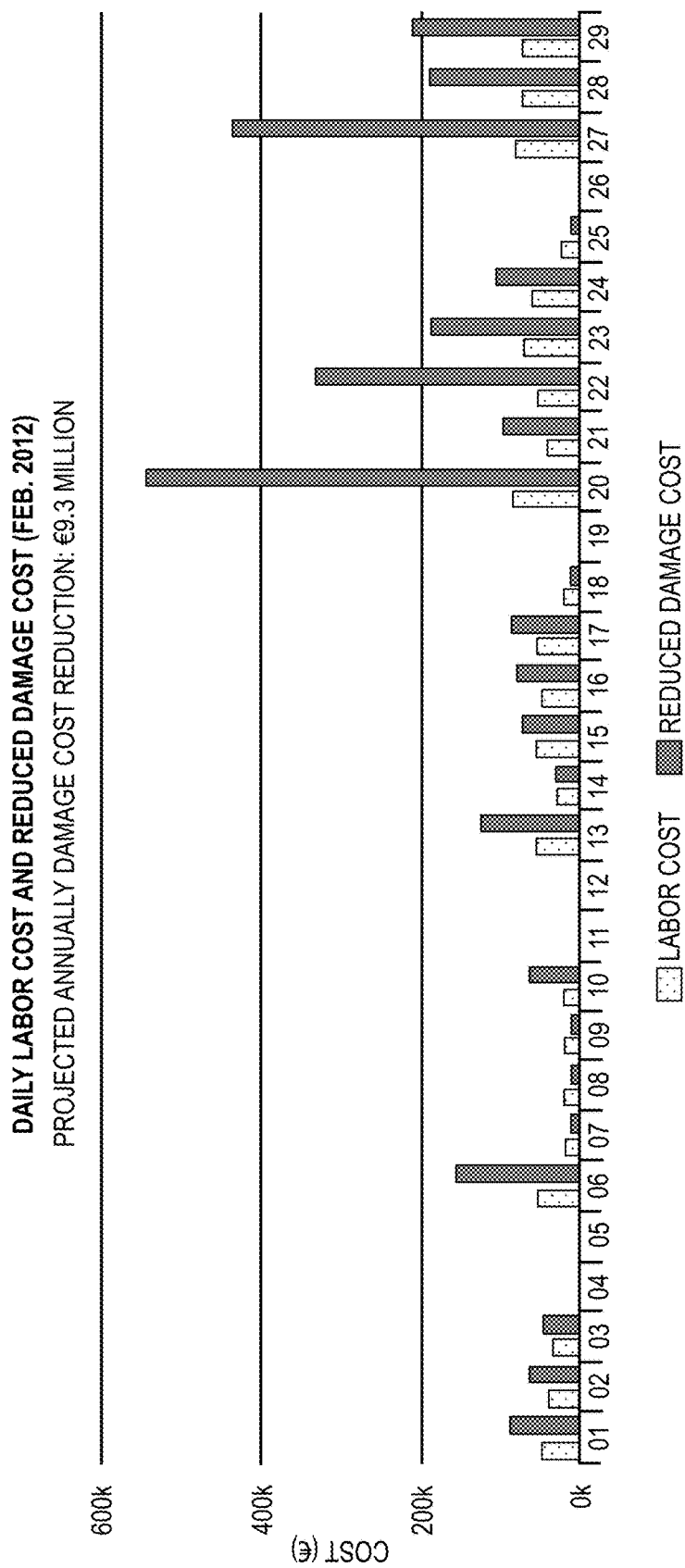

With regard to the clustering of digging events as performed by the first processing module 310, FIG. 3B is a graph conceptually depicting the number of digging events as a function of date for an illustrative scenario in which aspects of the invention may be employed. Specifically, FIG. 3B shows an exemplary number of digging events grouped by date. On average, each day indicates that there can be hundreds of daily digging events in a small country (e.g., the Netherlands); in this illustration, an average of about 700 events per day. For a given planning horizon, such as, for example, one week, or a large geographical area (e.g., Texas), there can be thousands of events to track. In such a scenario, the optimization problem can become too large to solve. Thus, to reduce computational cost, digging events are first clustered, according to one or more embodiments, into disjoint groups based on a set of factors, such as, but not limited to, distance between digging events and required type of supervisors, among other factors. One or more factors, such as, for example, distance, is preferably correlated to one or more other factors, such as, for example, transportation cost for a digging supervisor to monitor multiple digging sites (events). Different digging activities usually require digging supervisors with different knowledge and expertise of the power grid or other infrastructure and equipment. Second, digging events within a group are optimally selected for monitoring, and a work schedule is generated on a planning horizon by planning horizon basis.

In terms of the clustering problem formulation, a k-means algorithm is perhaps one of the most powerful tools for clustering vector-based data, and is therefore well-suited for implementation by the first processing module 310 in performing the clustering of digging events. It is to be understood, however, that embodiments of the invention contemplate other suitable clustering formulation methodologies, as will become apparent to those skilled in the art given the teachings herein. Each unit (or point) is characterized by a number of features such as, for instance, distance and types of supervisors. The k-means algorithm aims to maximize the similarities between points in the same cluster, which is achieved by minimizing the total distances between all points from their respective centroids. To avoid empty clusters or clusters with a significantly different number of units, a constraint is revised to the standard k-mean formulation. Hence, given a set of points $\{p_1, \ldots, p_{|N|}\}$, where each point is a d-dimensional real vector, the classical clustering problem can be expressed using the following optimization problem of equations:

$$\min_{x,w} g(x, w) = \sum_{i \in N, j \in K} w_{ij} \|x_j - p_i\|_2^2 \quad (4)$$

such that $$\Sigma_{j \in K} = w_{ij} = 1, i \in N,$$

$$w_{ij} \in \{0,1\}, i \in N, j \in K$$

$$l_j \leq \Sigma_{i \in N} w_{ij} \leq u_j, j \in K$$

where $x_j$ is the centroid of the j-th cluster and $w_{ij}=1$ if the point $p_i$ is assigned to the j-th cluster, and $l_j$ and $u_j$ represent a lower and an upper bound, respectively, of $w_{ij}$ to prevent empty clusters and keep the size of each cluster as uniform as possible. This optimization can be efficiently solved using, for example, a mixed-integer linear programming (MILP) solver, such as, for example, IBM ILOG CPLEX Optimization Studio, also commonly referred to as CPLEX. FIGS. 3C through 3F conceptually depict illustrative results generated by the exemplary response optimization module 300 shown in FIG. 3A, according to an embodiment of the invention.

The optimization model is configured to minimize a sum of the total labor cost, the total risk cost of power outage if digging supervisors are assigned, and the total risk cost of power outage if digging supervisors are not assigned, subject to the constraints of risk cost risk of power outage, available supervisors of a given type, and change of outage probability assign/not assign a digging supervisor, among other factors. An expression for an exemplary optimization model according to an embodiment of the invention was described in equation (2) above (or reduced equation (3), where only one digging supervisor is need per digging event (i.e., M=1)).

Figure 4:
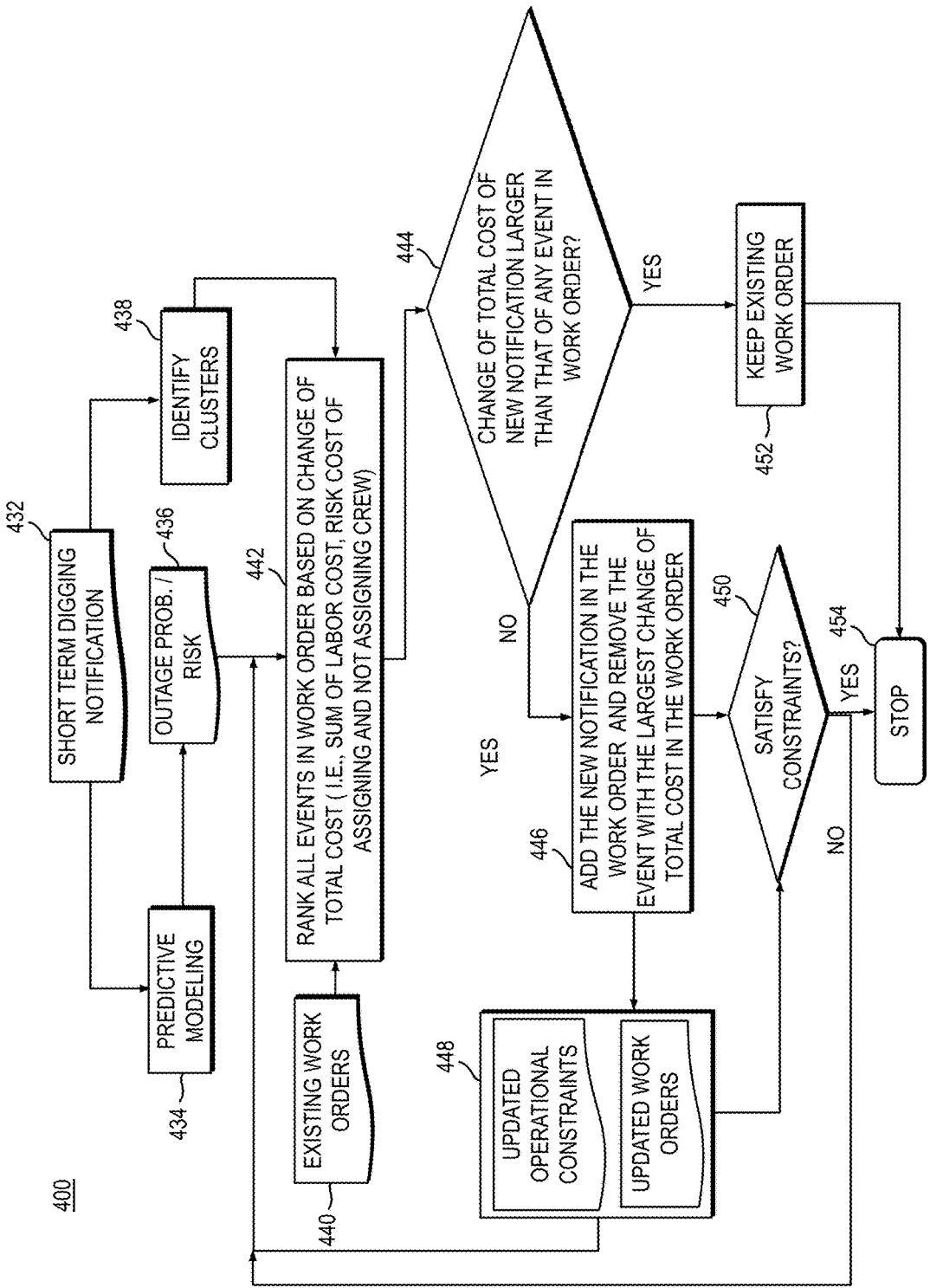
FIG. 4 is a flow diagram depicting at least a portion of an exemplary method for performing adaptive response optimization which may be implemented by the illustrative adaptive response optimization module shown in FIG. 1, according to an embodiment of the invention.

FIG. 4 is a flow diagram depicting at least a portion of an exemplary method 400 for performing adaptive response optimization which may be implemented by the adaptive response optimization module 142 shown in FIG. 1, according to an embodiment of the invention. The adaptive response optimization method 400 is suitable for use in the illustrative system 100 of FIG. 1 for predicting and managing power outages. As previously described, when short-term digging notifications are received, the adaptive response optimization module (e.g., 142 in FIG. 1) tries to preserve the existing optimal work schedule of digging supervisors and optimally determine the response to the newly received digging notifications in terms of whether or not to monitor. To accomplish this, the adaptive response optimization method 400 performs predictive modeling, which is preferably performed using a predictive modeling module or other processor (not explicitly shown, but implied), which is configured to receive the short-term digging notifications and to generate an outage probability/risk output as a function of the received short-term digging notifications. The adaptive response optimization method 400 is also configured to identify clusters of features among the received short-term digging notifications, as will be described in further detail below. In the illustrative embodiment shown in FIG. 4, the determination regarding the response to the newly received digging notifications is made primarily in terms of cost, although embodiments of the invention similarly contemplate other factors that can be used in the adaptive response optimization methodology.

The exemplary adaptive response optimization method 400 can be implemented in multiple processing modules configured to perform the stated functional steps. While a separate processing module can be configured to perform each of the corresponding steps, it is to be appreciated that, in accordance with one or more embodiments, more than one functional step can be performed by the same processing module, as will become apparent to those skilled in the art given the teachings herein.

As apparent from FIG. 4, short-term digging notifications are received in step 432. In step 434, predictive modeling is performed on the received short-term digging notifications to generate a corresponding outage probability/risk output 436. Additionally, step 438 identifies clusters of features among the received short-term digging notifications. Based on the identified clusters, the outage probability/risk, and existing work orders 440, all of the events in the work order are ranked in step 442 based on a change of total cost (i.e., sum of labor cost, risk cost of assigning and not assigning crew).

In step 444, each of the ranked events generated in step 442 is compared with a new work order to determine whether or not the change in total cost of the new notification is larger than that of any event in the existing work order. If the change in total cost of the new notification is larger than that of the existing work order, the existing work order is kept in step 452 and the method 430 ends at step 454. Alternatively, if the change in total cost of the new notification is not larger than that of the existing work order, as determined in step 444, the new notification is added to the work order and the event having the largest change of total cost in the work order is removed in step 446. Additionally, the operational constraints and work orders are updated in step 448. These updated constraints and work orders are then used in subsequent processing.

Once the new notification is added to the work order and the event having the largest change of total cost in the work order is removed in step 446, step 450 checks to determine whether the constraints stored at step 448 have been satisfied. If the constraints have been satisfied, the method 430 ends at step 452. If the constraints have not been satisfied, the method 430 returns to step 442 to evaluate a new work order. Thus, method 430 performs an iterative approach for optimizing a response. It is to be appreciated that other methods for performing adaptive response optimization are similarly contemplated, in accordance with alternative embodiments.

Predictive modeling, as may be performed, for example, in a predictive modeling module (e.g., 116 or 144 in FIG. 1), can be expressed according to one or more embodiments as follows:

$$\pi(x) = \frac{\exp(\beta^T x)}{1 + \exp(\beta^T x)} = \frac{1}{\exp(-\beta^T x) + 1}, \quad (5)$$

where the inputs x represent multiple predicting variables (e.g., distance, depth, activity types, diggers, etc.), and $\beta$ are the coefficients to be estimated. A large value of $\beta$ results in a large value of $\pi(x)$ (i.e., a large probability of power outage). Accordingly, the value of $\beta$ associated with each digger reflects its risk of inducing digging damage.

In FIGS. 5A through 5C, which conceptually depict an illustrative digger risk ranking scenario according to an embodiment of the invention, each digger is ranked based on $\beta$ values. For example, with reference to FIGS. 5A-5C, the digger risk ranking shows the risk rank of 1112 diggings based on corresponding $\beta$ values. Threshold values can be selected to organize diggers into different ranks; five, in this example, although embodiments of the invention are not limited to any specific organization of diggers. Similarly the $\beta$ value associated with each type of digging activity reflects its risk of inducing digging damage and can be used for risk ranking.

Figure 5D:
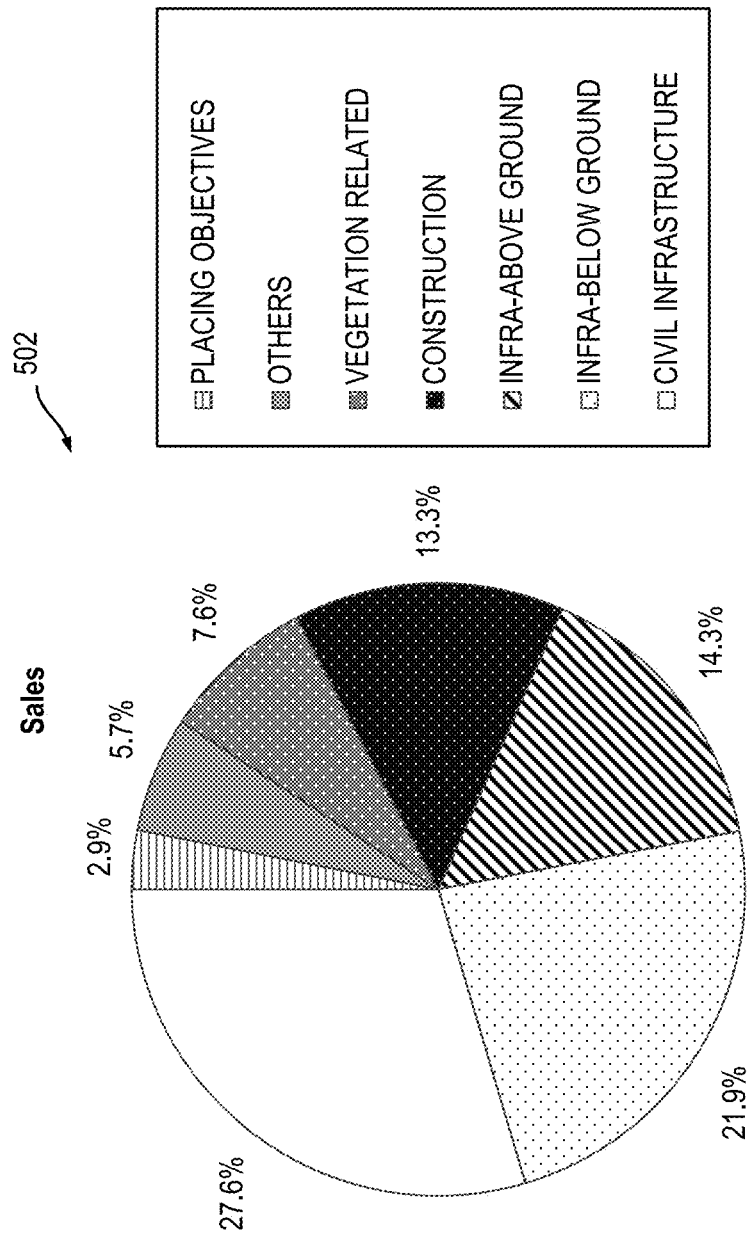
FIG. 5D conceptually depicts one method of organizing activity types into groups and exemplary risk percentages allocated to the various activity groups, according to an embodiment of the invention.

By way of example only and without loss of generality, FIG. 5D conceptually depicts results and validation of organizing activity types into groups and exemplary risk percentages allocated to the various activity groups, according to an embodiment of the invention. More particularly, pie graph 502 depicts one exemplary division of activity types into groups, each of the groups having prescribed risk percentages assigned thereto. Bar graph 504 in FIG. 5C depicts an exemplary frequency of digging damage associated with certain of the risk groups noted in the pie graph 502.

The output generated by the predictive modeling in equation (5) above is represent as $\pi(x)$. This output is constrained between 0 and 1 and is indicative of a probability of the dependent variable equaling a "success" when the probability is equal to or greater than a prescribed threshold value (e.g., $\pi(x) > 0.5$, the threshold value in this example), or a "failure" when the probability is less than the prescribed threshold (e.g., $\pi(x) < 0.5$). In other words, the output $\pi(X)$ generated by the predictive modeling represents the probability that an outage event can occur.

Figures 6C, 7:
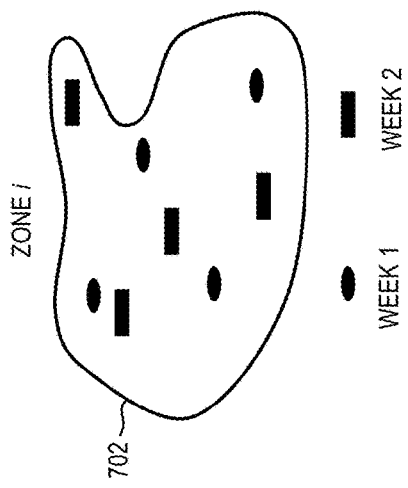

In terms of risk determination, the following expression is used, in one or more embodiments, to calculate risk:

Risk=Probability×Impact, where the "Impact" can be represented by one or more of a plurality of factors, including, but not limited to, a number of customers that can experience a loss of power due to a particular digging activity, a type of customer that can be impacted (e.g., hospital has a relatively larger impact compared to a residential customer), a duration of power outage for multiple numbers of customers, a cost of an outage event due to customer minute loss, and a sum of repair costs and the cost associated with any of the above-mentioned impact factors. FIGS. 6A through 6C conceptually depict an exemplary outage prediction output result which may be generated by the system 100 shown in FIG. 1, including a listing of predicted outage events corresponding to two exemplary threshold levels; namely, 0.03 and 0.04. It is to be appreciated that embodiments of the invention are not limited to any specific format of the system output, nor are embodiments of the invention limited to the type of information presented in the system output.

Figure 8:
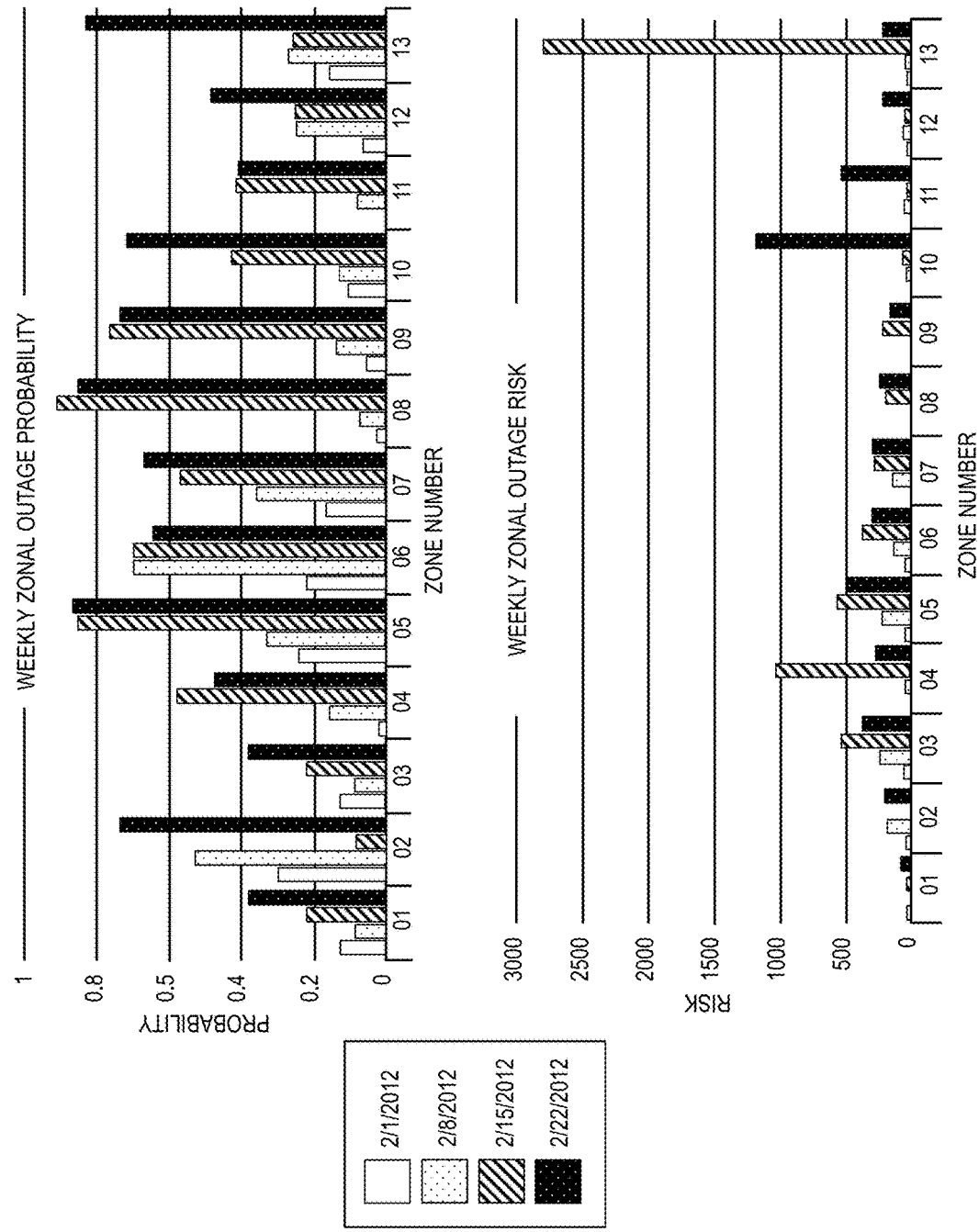
FIG. 8 conceptually depicts exemplary output results of weekly outage probabilities and weekly outage risks as a function of prescribed zones of digging activities, according to an embodiment of the invention.

As previously explained, outage probability/risk can be determined, according to one or more embodiments of the invention, using a zonal approach. By way of illustration only and without limitation, with reference to FIG. 7, which illustrates exemplary digging plans over planning periods in a given zone i 702, suppose there are K planned digging activities in zone i over a prescribed period of time (e.g., week 1, shown in example output of FIG. 8). The probability of a power outage occurring is given by 1 minus the probability that none of these K activities have caused a power outage. The zonal outage probability can be expressed as follows:

$$p_i = 1 - \prod_{k=1}^{K} \pi_k(x)$$

The zonal risk of power outage due to the K digging activities can be computed as Risk=Probability×Impact.

Given the discussion thus far, it will be appreciated that, in general terms, an exemplary method for predicting and managing an occurrence of a power outage resulting from human activity includes the steps of: obtaining at least one notification indicative of a planned human activity event occurring within a prescribed period of time; generating, using a data correction module, a corrected human activity notification as a function of said at least one notification indicative of the planned human activity event and data corresponding to at least one of power grid information, geographical information relating to the power grid and customers utilizing the power grid, power grid customer information, and historical information corresponding to prior power outages resulting from human activity events; generating, using a first predictive modeling module, an outage probability as a function of the corrected human activity notification and trained predictive modeling data, the outage probability indicative of a likelihood of a power outage resulting from the planned human activity event; generating, using a response optimization module, an optimization model indicative of an outage probability as a function of said outage probability; and initiating at least one action for mitigating the occurrence of said power outage resulting from human activity as a function of said optimization model.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 9:
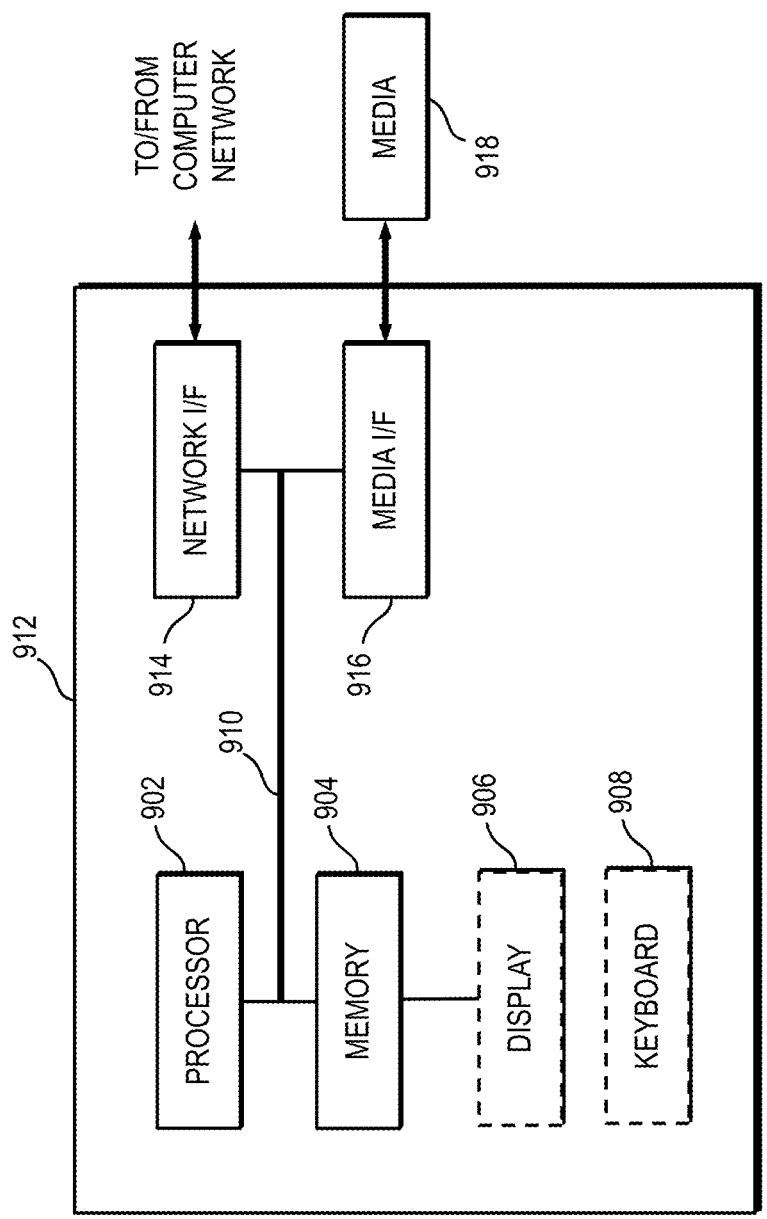
FIG. 9 is a block diagram depicting at least a portion of an exemplary computer system that may be useful in implementing one or more embodiments and/or elements of the invention.

One or more embodiments can make use of software running on a general purpose computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 918 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the context of this document, a computer readable storage medium may be any non-transitory medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a non-transitory computer readable storage medium; the modules can include, for example, any or all of the elements depicted in the block diagrams and/or described herein; by way of example and not limitation, an input module, a processing module, a data correction module, a predictive modeling module, a response optimization module, an asset management module, a customer management module, a sequential model update module and an adaptive response optimization module. The method steps can then be carried out using the distinct modules and/or sub-modules of the system, as described above, with at least a portion of a subset of the modules executing on one or more hardware processors 902. Further, a computer program product can include a non-transitory computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuits (ASICs), functional circuitry, one or more appropriately programmed general purpose digital computers with associated memory, and the like. Given the teachings of embodiments of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented herein for purposes of illustration only and is not intended to be exhaustive or limited to the invention in the form disclosed. Many modifications and variations will become apparent to those of ordinary skill in the art given the teachings herein without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for predicting and managing an occurrence of a power outage resulting from a human activity event, the method comprising the steps of:
   obtaining at least one notification indicative of a planned human activity event occurring within a prescribed period of time;
   generating, using a data correction circuit, a corrected human activity notification as a function of said at least one notification indicative of the planned human activity event and data corresponding to at least one of power grid information, geographical information relating to a power grid and customers utilizing the power grid, power grid customer information, and historical information corresponding to prior power outages resulting from human activity events;
   generating, using a first predictive modeling circuit, an outage probability as a function of the corrected human activity notification and trained predictive modeling data, the outage probability indicative of a likelihood of said power outage resulting from the planned human activity event;
   generating, using a response optimization circuit, an optimization model indicative of an outage probability as a function of said outage probability; and
   initiating at least one action for mitigating the occurrence of said power outage resulting from the planned human activity event as a function of said optimization model;
   wherein generating said optimization model indicative of the outage probability comprises:
   obtaining at least a subset of said data corresponding to said at least one of power grid information, geographical information relating to the power grid and customers utilizing the power grid, and power grid customer information;
   clustering, using a first processing circuit, human activity events as a function of said obtained data;
   estimating, using a second processing circuit, an impact of assigning supervisors to monitor at least a subset of the human activity events; and
   generating, using a third processing circuit, the optimization model as a function of prescribed cost and operational constraints, said clustered human activity events, and an outage risk per human activity event.

2. The method of claim 1, further comprising generating a ranking of risk imposed by at least one of a plurality of types of human activities and entities engaged in a corresponding plurality of said types of human activities.

3. The method of claim 1, further comprising estimating a reduction in risk of a power outage resulting from the human activity associated with initiating the at least one response for mitigating the occurrence of said power outage.

4. The method of claim 1, wherein generating said outage probability comprises generating at least one of a first output corresponding to a risk ranking, a second output corresponding to an outage risk per human activity event, and a third output corresponding to a zonal outage risk.

5. The method of claim 1, wherein estimating the impact of assigning supervisors to monitor at least a subset of the human activity events is performed by measuring a change in outage risk.

6. The method of claim 1, further comprising:
receiving said at least one action for mitigating the occurrence of said power outage; and
optimizing, using an adaptive response optimization circuit, a response to a newly received notification indicative of a planned human activity event by determining whether to monitor said planned human activity event.

7. The method of claim 1, wherein generating said outage probability comprises:
using a set of trained models and parameter priors to receive said corrected human activity notification; and
predicting risk ranking as a function of at least one of prescribed factors, outage probability of individual human activity events, outage risk of individual human activity events, zonal outage probability and zonal outage risk.

8. A method for predicting and managing an occurrence of a power outage resulting from a human activity event, the method comprising the steps of:
obtaining at least one notification indicative of a planned human activity event occurring within a prescribed period of time;
generating, using a data correction circuit, a corrected human activity notification as a function of said at least one notification indicative of the planned human activity event and data corresponding to at least one of power grid information, geographical information relating to a power grid and customers utilizing the power grid, power grid customer information, and historical information corresponding to prior power outages resulting from human activity events;
generating, using a first predictive modeling circuit, an outage probability as a function of the corrected human activity notification and trained predictive modeling data, the outage probability indicative of a likelihood of said power outage resulting from the planned human activity event;
generating, using a response optimization circuit, an optimization model indicative of an outage probability as a function of said outage probability; and
initiating at least one action for mitigating the occurrence of said power outage resulting from the planned human activity event as a function of said optimization model;
wherein generating said outage probability comprises generating at least one of a first output corresponding to a risk ranking, a second output corresponding to an outage risk per human activity event, and a third output corresponding to a zonal outage risk;
wherein the human activity comprises digging, and wherein the method further comprises:
initiating one or more digging supervisor work orders as a function of said outage risk per human activity event; and
generating an optimal work schedule of digging supervisors.

9. The method of claim 8, wherein initiating at least one action for mitigating the occurrence of said power outage is performed as a function of said outage risk per human activity event generated by the first predictive modeling circuit.

10. The method of claim 8, further comprising determining, using an asset management module, one or more prescribed actions to take for mitigating the occurrence of said power outage as a function of said outage risk per human activity event generated by the first predictive modeling circuit.

11. The method of claim 10, wherein said one or more prescribed actions comprise at least one of initiating at least one repair action as a function of the outage risk per event and determining at least one preventative maintenance action as a function of the outage probability and a health of one or more components in the power grid.

12. The method of claim 8, further comprising optimally selecting, using said response optimization circuit, at least a subset of human activity events to be monitored by said digging supervisors.

13. The method of claim 8, further comprising generating, using a second predictive modeling circuit, an outage risk for said at least one notification indicative of the planned human activity event.

14. A method for predicting and managing an occurrence of a power outage resulting from a human activity event, the method comprising the steps of:
obtaining at least one notification indicative of a planned human activity event occurring within a prescribed period of time;
generating, using a data correction circuit, a corrected human activity notification as a function of said at least one notification indicative of the planned human activity event and data corresponding to at least one of power grid information, geographical information relating to a power grid and customers utilizing the power grid, power grid customer information, and historical information corresponding to prior power outages resulting from human activity events;
generating, using a first predictive modeling circuit, an outage probability as a function of the corrected human activity notification and trained predictive modeling data, the outage probability indicative of a likelihood of said power outage resulting from the planned human activity event;
generating, using a response optimization circuit, an optimization model indicative of an outage probability as a function of said outage probability; and
initiating at least one action for mitigating the occurrence of said power outage resulting from the planned human activity event as a function of said optimization model;
wherein generating said corrected human activity notification comprises:
receiving at least one notification indicative of a planned human activity event having missing factors;
dividing, using a first processing circuit, features of the received notification with said missing factors into at least first and second sets;
supplying the first set of features to a second processing circuit, the second processing circuit associating clusters based on known factors as a function of the first set of features;
supplying the second set of features to a third processing circuit, the third processing circuit clustering the second set of features into a plurality of types of human activities;
estimating, using a fourth processing circuit, a distribution of each factor in a given one of the plurality of clusters; and
generating the corrected human activity notification including said missing factors as a function of associated clusters generated by the second processing circuit and said estimated distribution of each factor in the given one of the plurality of clusters generated by the fourth processing circuit.

15. A method for predicting and managing an occurrence of a power outage resulting from a human activity event, the method comprising the steps of:
- obtaining at least one notification indicative of a planned human activity event occurring within a prescribed period of time;
- generating, using a data correction circuit, a corrected human activity notification as a function of said at least one notification indicative of the planned human activity event and data corresponding to at least one of power grid information, geographical information relating to a power grid and customers utilizing the power grid, power grid customer information, and historical information corresponding to prior power outages resulting from human activity events;
- generating, using a first predictive modeling circuit, an outage probability as a function of the corrected human activity notification and trained predictive modeling data, the outage probability indicative of a likelihood of said power outage resulting from the planned human activity event;
- generating, using a response optimization circuit, an optimization model indicative of an outage probability as a function of said outage probability;
- initiating at least one action for mitigating the occurrence of said power outage resulting from the planned human activity event as a function of said optimization model;
- receiving said at least one action for mitigating the occurrence of said power outage; and
- optimizing, using an adaptive response optimization circuit, a response to a newly received notification indicative of said planned human activity event by determining whether to monitor said planned human activity event;
- wherein said optimizing the response to a newly received notification indicative of said planned human activity event comprises:
- performing predictive modeling, using a predictive modeling circuit, on said newly received notification indicative of said planned human activity event and generating at least one of a corresponding outage probability and outage risk therefrom;
- identifying clusters of features among received notifications indicative of planned human activity events;
- ranking at least a subset of the notifications indicative of said planned human activity events based on a change in total cost of the planned human activity events, as a function of the identified clusters of features, said at least one of the corresponding outage probability and outage risk, and existing work orders;
- determining, for each of said ranked notifications indicative of said planned human activity events, whether the change in total cost of the newly received notification indicative of said planned human activity event is larger than that of said existing work orders;
- when the change in total cost of the newly received notification indicative of said planned human activity event is not larger than that of said existing work orders, adding said newly received notification indicative of said planned human activity event to said existing work orders and removing an event having a largest change of total cost from the existing orders; and
- when the change in total cost of the newly received notification indicative of said planned human activity event is larger than that of said existing work orders, keeping the existing work order.

16. The method of claim 15, further comprising:
- updating operational constraints and work orders as a function of said newly received notification indicative of a planned human activity event;
- determining whether the updated operational constraints have been satisfied; and
- when the updated operational constraints have not been satisfied, performing the step of ranking at least a subset of the notifications indicative of planned human activity events for a new work order.

17. An apparatus for predicting and managing an occurrence of a power outage resulting from a human activity event, the apparatus comprising:
- a data correction circuit configured to obtain at least one notification indicative of a planned human activity event occurring within a prescribed period of time and to generate a corrected human activity notification as a function of said at least one notification indicative of the planned human activity event and data corresponding to at least one of power grid information, geographical information relating to a power grid and customers utilizing the power grid, power grid customer information, and historical information corresponding to prior power outages resulting from human activity events;
- a first predictive modeling circuit configured to generate an outage probability as a function of the corrected human activity notification and trained predictive modeling data, the outage probability indicative of a likelihood of said power outage resulting from the planned human activity event;
- a response optimization circuit configured to generate an optimization model indicative of an outage probability as a function of said outage probability and to initiate at least one action for mitigating the occurrence of said power outage resulting from the human activity as a function of said optimization model;
- wherein said response optimization circuit comprises:
- a first processing circuit configured to obtain at least a subset of said data corresponding to said at least one of power grid information, geographical information relating to the power grid and customers utilizing the power grid, and power grid customer information and to estimate human activity events as a function of said obtained data;
- a second processing circuit configured to estimate an impact of assigning supervisors to monitor at least a subset of the human activity events; and
- a third processing circuit configured to generate the optimization model as a function of prescribed cost and operational constraints, said clustered human activity events, and an outage risk per human activity event.

18. The apparatus of claim 17, further comprising at least one processor configured to generate a ranking of risk imposed by at least one of a plurality of types of human activities and entities engaged in a corresponding plurality of said types of human activities.

19. The apparatus of claim 17, wherein said response optimization circuit comprises:
- a first processing circuit configured to obtain at least a subset of said data corresponding to said at least one of power grid information, geographical information relating to the power grid and customers utilizing the power grid, and power grid customer information and to estimate human activity events as a function of said obtained data;

a second processing circuit configured to estimate an impact of assigning supervisors to monitor at least a subset of the human activity events; and a third processing circuit configured to generate the optimization model as a function of prescribed cost and operational constraints, said clustered human activity events, and an outage risk per human activity event.

20. The apparatus of claim 17, wherein said first predictive modeling circuit is configured to generate said outage probability by generating at least one of a first output corresponding to a risk ranking, a second output corresponding to an outage risk per human activity event, and a third output corresponding to a zonal outage risk.

21. An apparatus for predicting and managing an occurrence of a power outage resulting from a human activity event, the apparatus comprising:

a data correction circuit configured to obtain at least one notification indicative of a planned human activity event occurring within a prescribed period of time and to generate a corrected human activity notification as a function of said at least one notification indicative of the planned human activity event and data corresponding to at least one of power grid information, geographical information relating to a power grid and customers utilizing the power grid, power grid customer information, and historical information corresponding to prior power outages resulting from human activity events;

a first predictive modeling circuit configured to generate an outage probability as a function of the corrected human activity notification and trained predictive modeling data, the outage probability indicative of a likelihood of a power outage resulting from the planned human activity event;

a response optimization circuit configured to generate an optimization model indicative of an outage probability as a function of said outage probability and to initiate at least one action for mitigating the occurrence of said power outage resulting from the human activity as a function of said optimization model;

wherein said data correction circuit is configured to obtain at least one notification indicative of said planned human activity event having missing factors, said data correction circuit further comprising:

a first processing circuit configured to divide features of the received notification with said missing factors into at least first and second sets;

a second processing circuit configured to obtain a first set of features and to associate clusters based on known factors as a function of the first set of features;

a third processing circuit configured to obtain a second set of features and to cluster the second set of features into a plurality of types of human activities; and a fourth processing circuit configured to estimate a distribution of each factor in a given one of a plurality of clusters and to generate the corrected human activity notification including said missing factors as a function of the associated clusters generated by the second processing circuit and said estimated distribution of each factor in the given one of the plurality of clusters.

22. An apparatus for predicting and managing an occurrence of a power outage resulting from a human activity event, the apparatus comprising:

a memory;

at least one processor coupled to said memory; and a non-transitory persistent storage medium that contains instructions which, when loaded into said memory, configure said at least one processor:

to obtain at least one notification indicative of a planned human activity event occurring within a prescribed period of time;

to generate a corrected human activity notification as a function of said at least one notification indicative of the planned human activity event and data corresponding to at least one of power grid information, geographical information relating to a power grid and customers utilizing the power grid, power grid customer information, and historical information corresponding to prior power outages resulting from human activity events;

to generate an outage probability as a function of the corrected human activity notification and trained predictive modeling data, the outage probability indicative of a likelihood of a power outage resulting from the planned human activity event;

to generate an optimization model indicative of an outage probability as a function of said outage probability; and to initiate at least one action for mitigating the occurrence of said power outage resulting from the human activity as a function of said optimization model;

wherein generating said optimization model indicative of the outage probability comprises:

obtaining at least a subset of said data corresponding to said at least one of power grid information, geographical information relating to the power grid and customers utilizing the power grid, and power grid customer information;

clustering human activity events as a function of obtained data;

estimating an impact of assigning supervisors to monitor at least a subset of the human activity events; and generating the optimization model as a function of prescribed cost and operational constraints, said clustered human activity events, and an outage risk per human activity event.

23. A non-transitory computer readable medium comprising computer executable instructions which when executed by a computer cause the computer to perform the steps of:

obtaining at least one notification indicative of a planned human activity event occurring within a prescribed period of time;

generating a corrected human activity notification as a function of said at least one notification indicative of the planned human activity event and data corresponding to at least one of power grid information, geographical information relating to a power grid and customers utilizing the power grid, power grid customer information, and historical information corresponding to prior power outages resulting from human activity events;

generating an outage probability as a function of the corrected human activity notification and trained predictive modeling data, the outage probability indicative of a likelihood of a power outage resulting from the planned human activity event;

generating an optimization model indicative of an outage probability as a function of said outage probability; and initiating at least one action for mitigating the occurrence of said power outage resulting from the human activity as a function of said optimization model;

wherein generating said optimization model indicative of the outage probability comprises:

obtaining at least a subset of said data corresponding to said at least one of power grid information, geographical information relating to the power grid and customers utilizing the power grid, and power grid customer information;

clustering human activity events as a function of obtained data;

estimating an impact of assigning supervisors to monitor at least a subset of the human activity events; and generating the optimization model as a function of prescribed cost and operational constraints, said clustered human activity events, and an outage risk per human activity event.

* * * * *